UNITED STATES PATENT OFFICE.

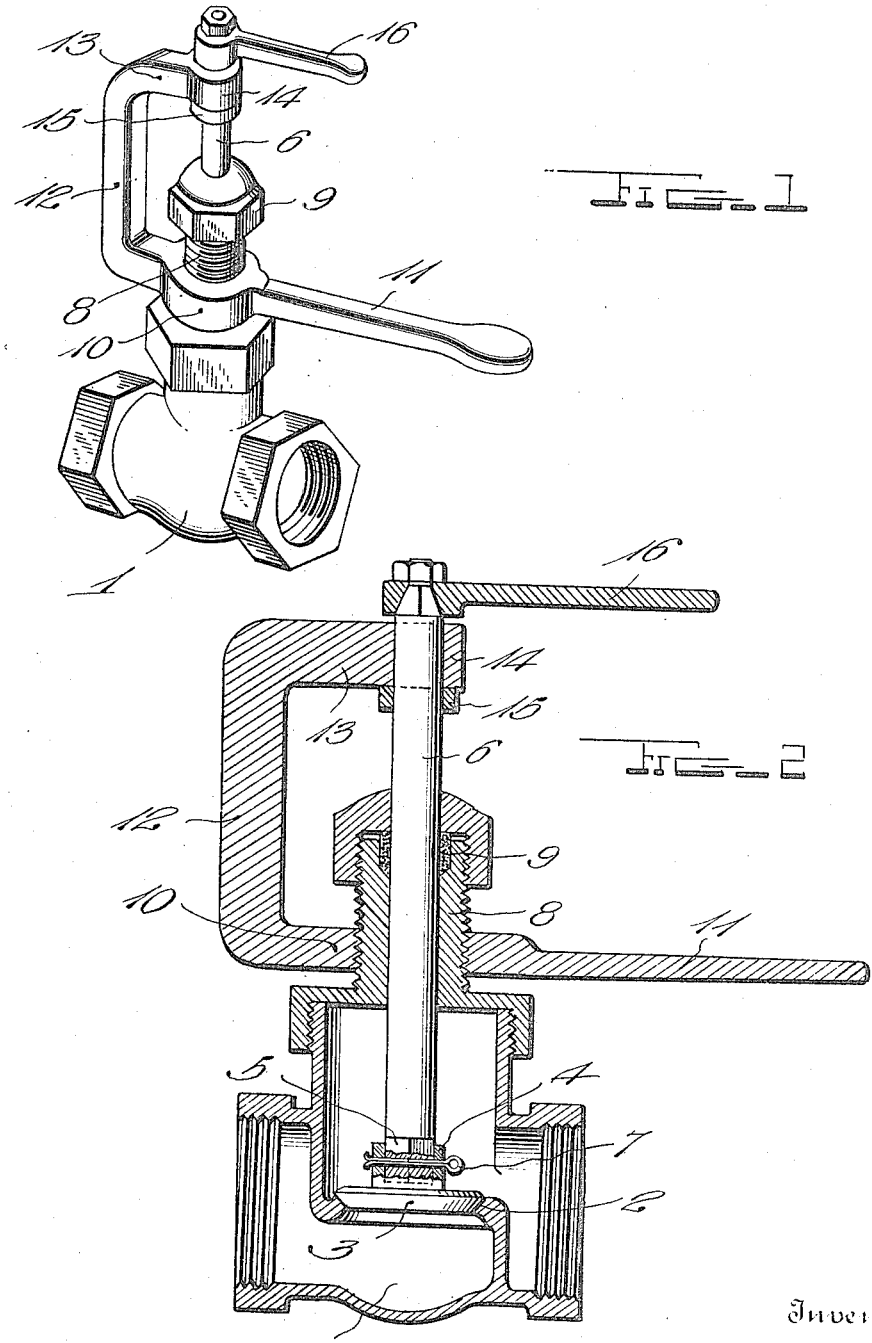

GEORGE H. BURGE, OF HUNTSVILLE, MISSOURI.

VALVE.

1,260,509.   Specification of Letters Patent.   Patented Mar. 26, 1918.

Application filed February 26, 1917.   Serial No. 151,102.

*To all whom it may concern:*

Be it known that I, GEORGE H. BURGE, a citizen of the United States, residing at Huntsville, in the county of Randolph and State of Missouri, have invented certain new and useful Improvements in Valves; and I do declare the following to be a full, clear, and exact description of the invention, such as will enable others skilled in the art to which it appertains to make and use the same.

My invention has for its object to provide an improved type of valve having means for forcing the valve proper against its seat and additional means for turning said valve to insure that it contacts properly with said seat.

With the foregoing general object in view, the invention resides in the novel features of construction and combination of parts to be hereinafter fully described and claimed, the descriptive matter being supplemented by the accompanying drawing which constitutes a part of this application and in which:

Figure 1 is a perspective view of a valve constructed in accordance with my invention; and Fig. 2 is an enlarged vertical section thereof.

In the drawing above briefly described, the numeral 1 has reference to a valve casing having an internal annular seat 2 with which a cone valve 3 coöperates, the outer side of said valve having a rectangular socket 4 in which the square inner end 5 of a valve stem 6 is received and held by a cotter pin or the like 7. The stem 6 is slidably and rotatably received in a nipple 8 which projects outwardly from the casing 1 in axial alinement with the seat 2, the outer end of said nipple being provided with a stuffing box 9 to prevent the leakage of fluid around the stem.

A nut 10 is threaded on the nipple 8 and is by preference formed integrally with the inner end of a hand lever 11 although other means could well be provided for turning said nut. An arm 12 projects from the nut 10 opposite the lever 11 and is by preference formed integrally therewith, said arm extending parallel to the stem 6 and being directed laterally at 13 adjacent the outer end of said stem and provided with a bearing 14 receiving said stem to swivel the arm 12 and stem together. Relative movement of the stem and bearing 14 is prevented in one direction by a collar 15 on said stem and in the other by a lever or the like 16 secured to the outer end of the stem.

By constructing the valve in the manner shown and described, operation of the lever 11 will cause the nut 10 to travel longitudinally of the nipple 8 and thus the arm 12 which is swiveled to the stem 6, will shift said stem longitudinally to seat or unseat the valve 3 as the case may be. After or while seating the valve by operation of lever 11, lever 16 may be so moved as to rotate the stem 6 and valve 3, thus insuring that the latter shall properly engage its seat 2 so as to prevent leakage. The arrangement described also permits grinding of the entire valve when required by oscillating or rotating the lever 16 the required amount and perhaps injecting a suitable grinding compound between the valve and its seat.

On account of the advantages derived, the construction shown and described constitutes the preferred form of the improved valve. It is to be understood, however, that within the scope of the invention as claimed, numerous changes may be made without sacrificing the principal advantages.

I claim:

A self-grinding valve comprising a casing having a seat and an outwardly extending cylindrical nipple in vertical alinement therewith and of equal diameter throughout its length, said nipple having external screw threads of the same pitch extending substantially throughout its length, a valve coacting with said seat and having a stem projecting through and above said nipple, a packing retaining cap threaded on the screw threads at the upper end of said nipple, a nut threaded on and movable along the remaining threads of said nipple, a swiveled connection between said nut and said stem for moving the latter longitudinally when said nut is rotated, means on said nut for rotating the same, and means for rotating said stem.

In testimony whereof I have hereunto set my hand in the presence of two subscribing witnesses.

GEORGE H. BURGE.

Witnesses:
KARLEEN N. ROBERTSON,
ANDREW J. BAGBY.